United States Patent [19]
Couturier et al.

[11] Patent Number: 6,073,184
[45] Date of Patent: Jun. 6, 2000

[54] METHOD OF TRANSMITTING A NOTIFICATION TO A RECEIVER FROM PLURAL NOTIFICATION SERVICES IN A DISTRIBUTED APPLICATION NETWORK, AND A NETWORK FOR IMPLEMENTING THE METHOD

[75] Inventors: Alban Couturier, Paris; Michel Ruffin, Rueil Malmaison; Marcel Van Der Meulen, Paris, all of France

[73] Assignee: Alcatel, Paris, France

[21] Appl. No.: 09/070,867

[22] Filed: May 1, 1998

[30] Foreign Application Priority Data

May 2, 1997 [FR] France ..................... 97 05451

[51] Int. Cl.[7] .................................................. G06F 13/00
[52] U.S. Cl. ..................... 709/313; 709/202; 709/206; 709/315; 709/328
[58] Field of Search .................... 709/201, 202, 709/203, 204, 205, 206, 207, 217, 218, 220, 223, 249, 311, 313, 315, 328, 400

[56] References Cited

U.S. PATENT DOCUMENTS

| 5,257,369 | 10/1993 | Skeen et al. | 395/650 |
|---|---|---|---|
| 5,794,038 | 8/1998 | Stutz et al. | 709/303 |
| 5,822,585 | 10/1998 | Noble et al. | 709/300 |
| 5,872,969 | 2/1999 | Copeland et al. | 709/101 |

FOREIGN PATENT DOCUMENTS

| 0 258 867 | 3/1988 | European Pat. Off. |
| 0 651 328 | 5/1995 | European Pat. Off. |
| 0 702 295 | 3/1996 | European Pat. Off. |

*Primary Examiner*—Viet D. Vu
*Attorney, Agent, or Firm*—Sughrue, Mion, Zinn, Macpeak & Seas, PLLC

[57] ABSTRACT

The invention relates to a method of transmitting a notification in a distributed-application information processing network from an emitter (10A) belonging to a first notification zone (10) of a software bus (8) having a first notification service (16) associated therewith to a receiver (12A) belonging to a second notification zone (12) of the software bus (8) having a second notification service (18) associated therewith. The receiver (12A) is enrolled with the second notification service (18) to receive notifications of a determined category. The method comprises the steps consisting in:

enrolling the second notification service (18) as a receiver of notifications from the first notification service (16); and transmitting said notification from the emitter (10A) to the receiver (12A) via the first notification service (16) and the second notification service (18), in succession.

The method is applicable to managing telecommunications networks.

21 Claims, 3 Drawing Sheets

METHOD OF TRANSMITTING A NOTIFICATION TO A RECEIVER FROM PLURAL NOTIFICATION SERVICES IN A DISTRIBUTED APPLICATION NETWORK, AND A NETWORK FOR IMPLEMENTING THE METHOD

FIELD OF THE INVENTION

The present invention relates to a method of transmitting a notification in an object-oriented and distributed-application data processing network. The invention also relates to such a network per se.

The invention is particularly applicable to the distributed object network architecture that complies with the "common object request broker architecture" (CORBA) specification published by "the object management group" (OMG).

BACKGROUND OF THE INVENTION

In the present application, the term "notification service" is used to cover both a notification service proper and an event service.

In the CORBA platform, notification services are commonly defined for asynchronous communication between distributed objects.

The objects are distributed over various data processor units present in the network. They communicate via a software bus called an "object request broker" (ORB) in the CORBA specification. The software bus can be subdivided into a plurality of notification zones that correspond in general, but not necessarily, to sites that are geographically remote from one another. Each notification zone has its own notification service for addressing notifications between the objects of the zone in question.

By way of example, the data processor units may be automatic switching systems in a telecommunications network or a set of workstations connected to one or more printers.

In such a network, the server objects, regardless of where they are to be found in the network, supply services to client objects that address requests for these services over the network. The role of the software bus is to deliver the requests to the objects concerned and to return the output values to the client objects. This operation takes place in transparent manner for the client object. In particular, the client object does not know where the objects are located in the network, how they are implemented, how they are stored, nor indeed how they are executed.

In order to be able to address a request, all the client object requires is the reference of the server object.

A notification or event service is adapted to transmit information coming from emitter objects to all or to only some of the receiver objects enrolled with the service.

A notification service differs from an event service in that, on being enrolled, receiver objects can define a filter so that they receive only those notifications that satisfy the filter criteria. In contrast, in an event service, all receiver objects enrolled to receive a given category of notification receive the same notifications.

A notification service is made up of a set of objects, and in particular a notification server administrator and notification channels, each of which is specific to a different category of data that can be transmitted.

The following communication model is used for this service. A set of emitters address notifications to the notification service which transmits the data to a set of receiver objects that are enrolled for this category of notification.

When the number of notifications is very high, or when the number of emitter objects or of receiver objects is very high, the notification service becomes a bottleneck slowing down operation.

It is therefore necessary to increase the number of notification services. Network objects then depend on different notification services and as a result they cannot receive the notifications emitted by all of the notification services.

SUMMARY OF THE INVENTION

An object of the invention is to propose a powerful solution that solves the above-posed problem, making it possible to achieve high performance, to group emitters and receivers together in logical manner, and making it possible to scale the network, i.e. to increase the size of the network.

To this end, the invention provides a method of transmitting a notification in a distributed-application data processing network, from an emitter belonging to a first notification zone having a first notification service associated therewith, to a receiver belonging to a second notification zone having a second notification service associated therewith, each notification service being adapted to notify notifications of a determined category to receivers enrolled with the notification service and/or to pick up notifications of a determined category from emitters registered with the notification service, the method being characterized in that it comprises the steps consisting in:

firstly enrolling the second notification service as a receiver of notifications from said first notification service and/or registering the first notification service as an emitter of notifications to the second notification service; and secondly transmitting said notification from said emitter to said receiver via the first notification service and the second notification service in succession.

In particular implementations, the method may include one or more of the following characteristics:

the step of enrolling the second notification service as a receiver of notifications from said first notification service and/or of registering the first notification service as an emitter of notifications to the second notification service is performed on a notification service administrator making a request to the first notification service;

the step of enrolling the second notification service as a receiver of notifications from said first notification service includes the following successive steps:
  the first notification service addresses a registration message to the second notification service;
  the second notification service returns an identifier of the second notification service to the first notification service; and
  the first notification service stores said identifier of the second notification service for subsequent transmission of notifications to the second notification service;

the step of registering the first notification service as an emitter of notifications to the second notification service includes the following successive steps:
  the first notification service addresses an identifier of the first notification service to the second notification service; and
  the second notification service stores said identifier of the first notification service to subsequently pick up notifications from the first notification service;

the step of enrolling the second notification service as a receiver of notifications from said first notification service and/or of registering the first notification service as a transmitter of notifications to the second notification service is performed by a notification service administrator making a request to the second notification service;

the step of enrolling the second notification service as a receiver of notifications from said first notification service includes the following successive steps:

the second notification service addresses an identifier of the second notification service to the first notification service; and the first notification service stores said identifier of the second notification service subsequently to notify notifications to the second notification service;

the step of registering the first notification service as an emitter of notifications to the second notification service includes the following successive steps:

the second notification service addresses an enrollment message to the first notification service;

the first notification service returns an identifier of the first notification service to the second notification service; and the second notification service stores said identifier of the first notification service subsequently to pick up notifications from the first notification service;

each notification service comprises a set of software components each including at least one notification channel specific to a determined category of notifications, and the step of enrolling the second notification service as a receiver of notifications from said first notification service is performed, when said notification is notified, by said notification channel of the first notification service corresponding to the determined category of notifications implementing the identifier of the notification channel associated with the second notification service;

each notification service comprises a set of software components each including at least one notification channel specific to a determined category of notifications, and the step of registering the first notification service as an emitter of notifications to the second notification service is performed, while picking up said notification, by the notification channel of the second notification service corresponding to the determined category of notifications implementing the identifier of the notification channel associated with the first notification service;

the notification is transmitted from said emitter to said receiver on the initiative of said emitter; and the notification is transmitted from said emitter to said receiver on the request of said receiver.

The invention also provides a distributed-application information processing network comprising firstly a first notification zone having a first notification service associated therewith and having an emitter linked thereto, and secondly a second notification zone having a second notification service associated therewith and having a receiver linked thereto, each notification service including means for notifying notifications of a determined category to receivers enrolled with the notification service and/or for picking up notifications of a determined category from emitters registered with the notification service, the network being characterized in that it includes means for enrolling the second notification service as a receiver of notifications from said first notification service and/or for registering the first notification service as an emitter of notifications to the second notification service, and means for transmitting said notification from said emitter to said receiver via the first notification service and the second notification service in succession.

In particular embodiments, the network may include one or more of the following characteristics:

it includes a notification service administrator adapted to address to the first notification service a request for enrollment of the second notification service as a receiver of notifications from said first notification service and/or for registration of the first notification service as an emitter of notifications to the second notification service;

to enroll the second notification service as a receiver of notifications from said first notification service, the first notification service includes means for addressing a registration message to the second notification service, the second notification service includes means for returning an identifier of the second notification service to the first notification service, and the first notification service includes means for storing said identifier of the second notification service in order subsequently to transmit notifications to the second notification service;

to register the first notification service as an emitter of notifications to the second notification service, the first notification service includes means for addressing an identifier of the first notification service to the second notification service, and the second notification service includes means for storing said identifier of the first notification service in order subsequently to pick up notifications from the first notification service;

it includes a notification service administrator adapted to address to the second notification service a request to enroll the second notification service as a receiver of notifications from said first notification service and/or to register the first notification service as an emitter of notifications to the second notification service;

to enroll the second notification service as a receiver of notifications from said first notification service, the second notification service includes means for addressing an identifier of the second notification service to the first notification service, and the first notification service includes means for storing said identifier of the second notification service in order subsequently to notify notifications to the second notification service;

to register the first notification service as an emitter of notifications to the second notification service, the second notification service includes means for addressing an enrollment message to the first notification service, the first notification service includes means for returning an identifier of the first notification service to the second notification service, and the second notification service includes means for storing said identifier of the first notification service in order subsequently to pick up notifications from the first notification service;

each notification service comprises a set of software components each including at least one notification channel specific to a determined category of notifications, and in order to enroll the second notification service as a receiver of notifications from said first notification service, said notification channel of the first notification service corresponding to the determined category of notifications includes means that operate during notification of said notification to implement the identifier of the associated notification channel of the second notification service;

each notification service comprises a set of software components each including at least one notification channel specific to a determined category of notifications, and in order to register the first notification service as an emitter of notifications to the second notification service, the notification channel of the second notification service corresponding to the determined category of notifications includes means that operate while picking up said notification to implement the identifier of the associated notification channel of the first notification service; and at least one of the emitters and receivers is an object.

The invention will be better understood on reading the following description given purely by way of example and made with reference to the drawings.

DETAILED DESCRIPTION OF THE PREFERRED EMBODIMENTS

Figure 1:
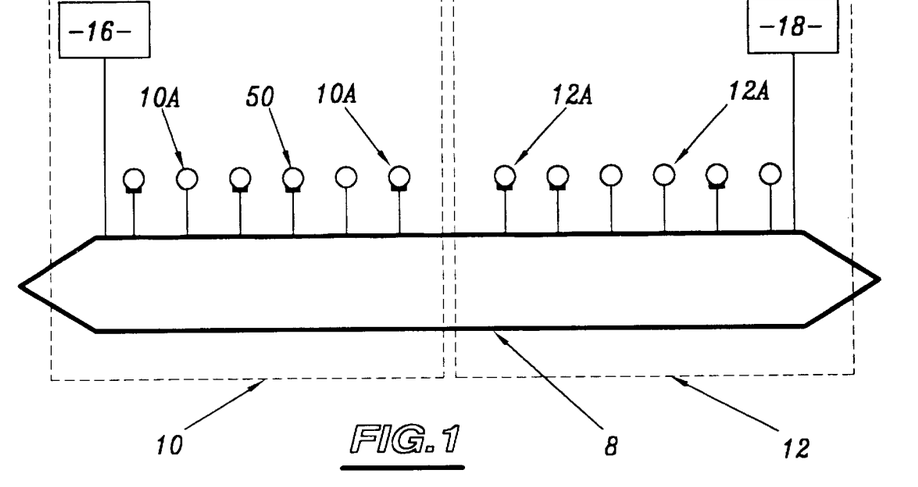
FIG. 1 is a diagrammatic view of an object-oriented distributed-application data processing network.

FIG. 1 shows a software bus 8 subdivided into two distinct notification zones given references 10 and 12. The term "software bus" is used to designate the entity which enables objects to send and receive requests in a distributed environment. Distributed applications are implanted in data processor units that intercommunicate firstly via the physical medium to which the data processor units present on the network are connected, and secondly by the lower layers of the communications protocol, i.e., for example, the IP (Internet protocol) layer and the TCP (transmission control protocol) layer.

The notification zones 10 and 12 are, for example, local networks used on two distinct sites of a single business.

A first set of emitter and/or receiver objects 10A is connected to the software bus in the first zone 10. Similarly, a second set of emitter and/or receiver objects 12A is connected to the software bus in the second zone 12. These objects are distributed over the various data processor units of the network and may be written in any language. In particular, some of these objects may be in the C++ language while others may be in the JAVA language.

In the figures, objects are represented by circles. Receiver objects include a communications interface that is specified as a function of the software bus used. This interface is represented by a black rectangle associated with the circle representing the object.

To implement the invention, the emitters need not be objects, but may be conventional software components, and in particular they may be conventional procedural programs. Under such circumstances, the object references which form the identifiers of the objects under consideration are replaced by identifiers for the software components under consideration, e.g. addresses. To simplify the description, it is assumed that the emitters are objects.

In the example described, it is assumed that the emitter objects are associated with printers and are suitable for addressing notifications concerning the operating state of a printer, in particular whether the printer is available or unavailable because of a breakdown. The receiver objects are assumed to be objects handling print functions and associated with workstations.

In accordance with the CORBA specification, the communications interface of an object is written in IDL (interface definition language). The IDL interface serves to define in static manner the interfaces of the objects, enabling objects to be shared between different object models.

After the IDL interface has been compiled, the resulting stub is linked to the implementation of the object.

Thus, a client object can interact with a remote server object merely by invoking IDL functions as for a local object and without being concerned about the physical location of the server object on the network. To this end, the client object can use the communications interface format of the server object to address its requests.

Two notification services, given respective references 16 and 18 are associated with the notification zones 10 and 12 respectively.

A notification service is a set of CORBA objects which operate on the software bus 8. All the objects of the notification service have an IDL communications interface. In addition, all of the network objects, regardless of the software bus to which they belong, know the reference of at least one object giving access to the notification service, and possibly also the IDL interface format thereof.

Figure 2:
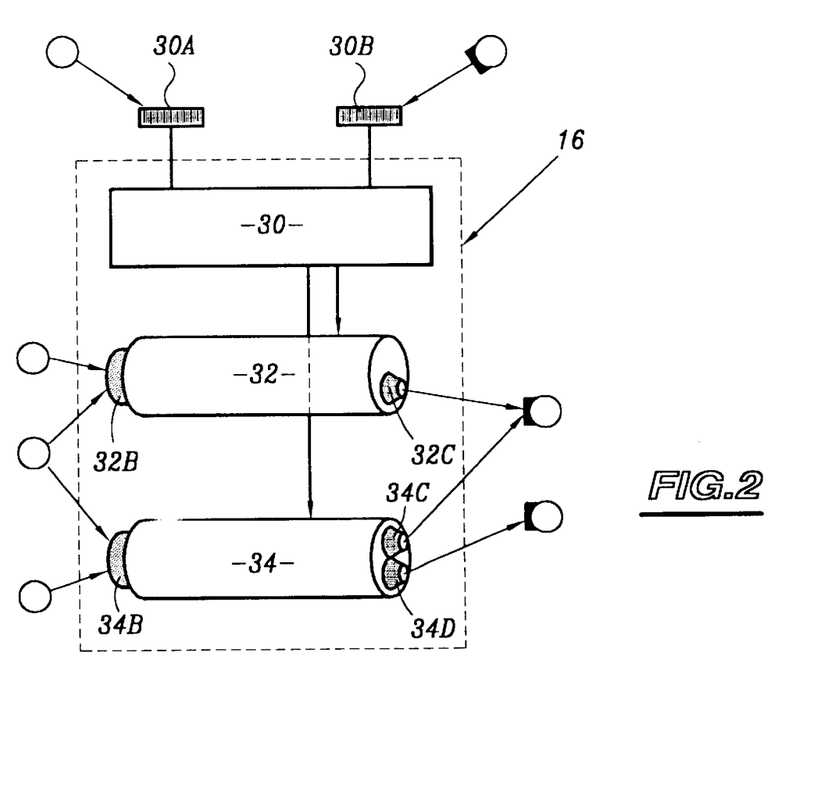
FIG. 2 is a diagrammatic view of a notification service explaining its main members and its operation.

FIG. 2 is a diagram of the notification service 16, by way of example.

This service has three objects. A first object is an administrator of the notification server, given reference 30, and it is associated with two notification channels given respective references 32 and 34. Each of the notification channels 32 and 34 is specific to a particular notification category. In the example under consideration, it is assumed that notification channel 32 is specific to notifications concerning black-and-white printing while notification channel 34 is specific to notifications concerning color printing.

The notification server administrator 30 includes an IDL interface for registering emitter objects using the administrator of the notification server. This has the reference 30A. This interface is adapted to enable emitter objects desiring to emit notifications via the notification service 16 to be registered. In particular, the registration interface 30A addresses to the emitter object seeking registration the reference of the object forming the notification channel with which the emitter object desires to be registered in order to be able to broadcast notifications thereby.

Similarly, the administrator of the notification server 30 includes an interface 30B for enrolling receiver objects. This IDL interface is adapted to enroll objects connected to the associated software bus so that these objects receive notifications issued by the notification service for which they are enrolled.

Enrollment is performed in particular by supplying the notification server administrator 30 with the reference of the enrolled receiver object.

Each notification channel 32, 34 forming a CORBA object is controlled by the notification server administrator 30. In particular, the notification server administrator 30 enrolls receiver objects with each of the notification channels corresponding to the category of notifications which the receiver object in question desires to have addressed thereto by supplying the references thereof to the notification channel under consideration.

Each notification channel also includes a notification channel input interface referenced 32B, 34B. These communication interfaces, written in IDL, are adapted to receive notifications directly from emitter objects sending a notification to the receiver objects. To this end, the emitter object address their requests to the input interface of the notification channel by using the reference specific to the channel. This reference is given to each emitter object by the notification server administrator 30 during registration of the emitter object.

Each notification channel also includes one or more filters, respectively referenced 32C for the channel 32 and 34C, 34D for the channel 34. Each filter corresponds to a receiver object to which a notification is to be addressed and they define test criteria which notifications must satisfy in order to be transmitted.

Each notification channel also knows the reference of the receiver object to which the notification is to be addressed. The reference of the object is communicated thereto during enrollment of the receiver object with the notification server administrator 30.

Figure 3:
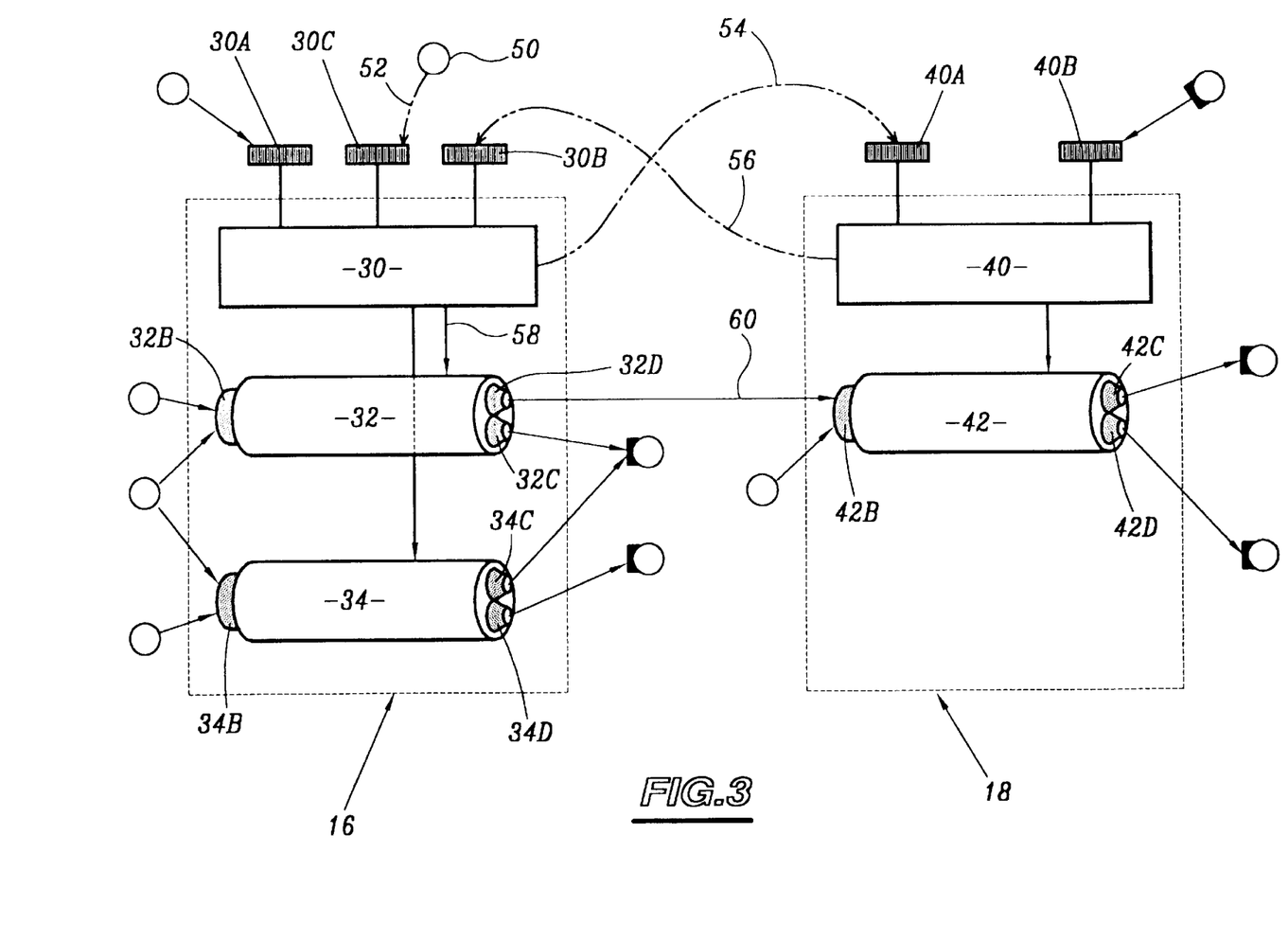
FIGS. 3 and 4 are diagrammatic views of two federated notification services of the invention.

In FIG. 3, both notification services 16 and 18 are shown side by side.

The notification service 18 includes a first object 40 forming a notification server administrator, and having functions analogous to those of the notification server administrator 30. It also includes a single further object 42 forming a notification channel. In the example described herein, the notification channel 42 is specifically adapted to transmitting notifications concerning black-and-white printing. It therefore corresponds to the notification channel 32 for the second notification zone 12. The other elements of the notification service 18 which correspond to elements of the notification service 16 are designated by the same reference numerals plus 10.

According to the invention, in order to enable a notification to be transmitted from an emitter object of the first notification zone 10 to a receiver object of the second notification zone 12, the notification services 16 and 18 are federated.

To this end, the second notification service 18 is enrolled with the first notification service 16 as an object receiving information emitted from the notification channel 32. For this purpose, an object 50 forming a notification service administrator is provided in the first zone 10 of the software bus. The notification service administrator 50 is adapted to send a federation request to the notification service 16.

To this end, the notification service administrator 30 includes an additional IDL interface 30C referred to as a "federation interface" which is of a format that is known to the administrator 50. In practice, the IDL interfaces 30A, 30B, and 30C are grouped together in a common stub associated with the notification server administrator 30. In addition, the notification service administrator 50 knows the reference of the notification server administrator 30.

The two notification services are federated as follows.

The notification service administrator 50 addresses a federation request to the notification server administrator 30 via the interface 30C as represented by arrow 52.

The notification server administrator 30 then addresses a request, represented by arrow 54, to the notification server administrator 40 so that the notification channel 32 is registered as an emitter object emitting to the notification channel 42. In return, the notification server administrator 40 addresses a request represented by arrow 56 to the notification server administrator 30 via its enrollment interface 30B, which request contains the reference of the notification channel 42.

Because it knows the reference of the channel 42 and as represented by arrow 58, the notification server administrator 30 instructs the channel 32 to store said reference. The notification channel 42 is thus stored by the channel 32 as a receiver. Thereafter, implementing said reference by the channel 32 causes notifications to be sent to the notification channel 42 via the input interface 42B. One such dispatch is represented by arrow 60.

It will be understood that under such conditions, when an emitter object of the first zone 10 of the software bus addresses a notification to the notification service 16, and the notification service administrator 50 has indicated that this notification is to be addressed to receiver objects present in the second zone 12, then the notification transits from the notification channel 32 to the notification channel 42, and thence to the receiver objects of the second notification zone 12.

Consequently, the receiver objects of the second zone can receive one or more notifications addressed to the first notification service 16 without themselves being enrolled therewith.

In the example described herein, the notification service administrator 50 federates the first and second notification services 16 and 18 concerning their notification channels relating to black-and-white printing. It thus ensures that the workstations installed in the second zone 12 receive information relating to the operating states of printers present in the first zone 10. Such a federation is particularly suitable when all of the black-and-white printers present in the second zone 12 are out of order. This makes it possible for the users to use a printer of the first zone 10, in the knowledge of the state thereof.

Under such circumstances, federating notification services makes it possible to address only certain notifications to receiver objects in the event of absolute necessity, the network manager evaluating when circumstances require such federation.

Thus, whatever the size of the network, the number of emitter/receiver objects associated with each notification service is limited, thereby preventing said services becoming clogged up. Nevertheless, it remains possible to address a notification to a large number of objects even if they are enrolled with only one notification service.

Consequently, it is no longer necessary for receiver objects to be individually enrolled with a plurality of notification services.

In addition, although the example described herein relates to a network implementing workstations and printers, the same method can be used for a telecommunications network having a plurality of switching systems, with the objects being dedicated to tracking the operating states of the switching systems.

Figure 4:
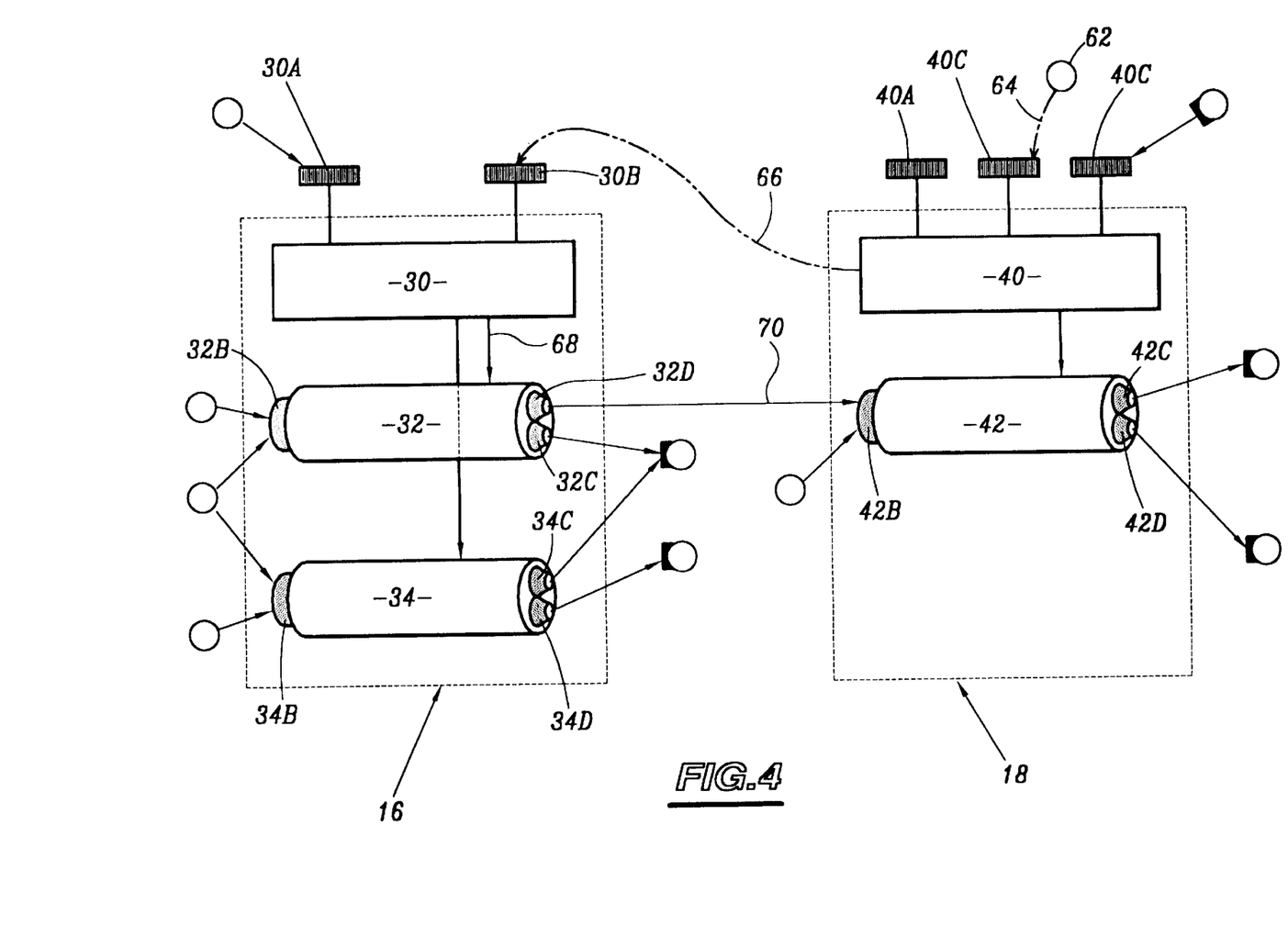

FIG. 4 is a diagram of a variant federation of the two notification services 16 and 18.

In this variant, the notification server administrator 30 does not have a federation interface. Instead, the notification server administrator 40 has a federation interface referenced 40C.

In addition, the notification service administrator, referenced 62 in this example, is adapted to send a federation request to the second notification service 18 via the federation interface 40C. The administrator 62 is present in the second notification zone 12. It knows the reference of the notification server administrator 40 so as to be able to address the federation request to the federation interface 40C.

In this variant implementation, two notification services are federated as follows.

The notification service administrator 62 address a federation request to the notification server administrator 40 via interface 40C, as represented by arrow 64. The notification server administrator 40 then addresses a request, as represented by arrow 66, to the notification server administrator 30 via its interface 30B so that the notification channel 42 is enrolled as a receiver object for receiving notifications from channel 32. To this end, the notification server administrator 40 addresses the reference of the notification channel 42. As represented by arrow 68, the notification server administrator 30 instructs channel 32 to store the notification channel 42 as a receiver object for receiving notifications.

As explained above, enrolling the notification channel 40 as an object for receiving notifications emitted by the notification channel 32 ensures that notifications from the channel 32 are sent to the channel 42 as represented by arrow 70, and thus ensures that notifications are sent to the receiver objects enrolled with the notification channel 42.

Whatever the way in which the federation method is implemented, while federated notifications services are in operation, notification can be transmitted at the initiative of the emitter object or of the receiver object.

In particular, when communication takes place using a push model, notification is transmitted from the emitter object to the receiver object via the first and second notification services in succession at the initiative of the emitter object.

In contrast, when communication is set up using a pull model, notification is transmitted from the emitter object to the receiver object via the first notification service and the second notification service in succession on the request of the receiver sending an interrogation to the second notification service which relays it to the first notification service and thus to the emitter object.

Under such circumstances, in order to federate the two notification services, the first notification service is registered with the second notification service as an emitter object that may address notifications thereto. Thus, the second notification service stores the reference or the identifier of the first notification service. The second notification service can thus pick up notifications from the first notification service by means of said identifier, where the contents of said notifications correspond to replies to the interrogation messages it receives.

The mechanism for registration as an emitter takes place in a manner analogous to the mechanism for enrollment of notification services as receivers, as explained above.

In particular, when the notification service administrator is adapted to address federation requests to the first notification service 16, registration of the first notification service 16 as an emitter of notifications to the second notification service 18 includes a first step consisting in the first notification service 16 addressing an identifier of the first notification service to the second notification service 18, followed by a step consisting in the second notification service 18 storing the identifier of the first notification service 16 so that it can subsequently pick up notifications from the first notification service.

In addition, when the notification service administrator is adapted to address federation requests to the second notification service 18, the step of registering the first notification service as an emitter of notifications to the second notification service includes successive steps consisting firstly in the second notification service 18 addressing an enrollment message to the first notification service 16, and then the first notification service 16 returning an identifier of the first notification service to the second notification service 18, and finally the second notification service 18 storing the identifier of the first notification service 16 so that it can subsequently pick up notifications from the first notification service 16.

In both cases, the steps are implemented from the objects forming notification server administrators 30 and 40 and the notification channels 32, 34, and 42 in a manner analogous to the steps described concerning enrollment of the second notification service as a receiver of notifications emitted by the first notification service. As a result, these steps are not described in further detail.

Such a method and transmission network can be implemented independently of the CORBA specification. In particular, they can be used with the DCOM protocol or with the RMI protocol.

What is claimed is:

1. A method of transmitting a notification in a distributed-application data processing network, from an emitter (10A) belonging to a first notification zone (10) having a first notification service (16) associated therewith, to a receiver (12A) belonging to a second notification zone (12) having a second notification service (18) associated therewith, each notification service being adapted to perform a notification operation comprising at least one of the operations of (i) sending notifications of a determined category to receivers enrolled with the notification service and (ii) receiving notifications of a determined category from emitters registered with the notification service, the method being characterized in that it comprises the steps of:

firstly performing a first operation comprising at least one of the operations of enrolling the second notification service (18) as a receiver of notifications from said first notification service (16) and registering the first notification service (16) as an emitter of notifications to the second notification service (18); and secondly transmitting said notification from said emitter (10A) to said receiver (12A) via the first notification service (16) and the second notification service (18) in succession.

2. A method according to claim 1, characterized in that said first operation is performed on a notification service administrator (50) making a request to the first notification service (16).

3. A method according to claim 2, characterized in that the step of enrolling the second notification service (18) as a receiver of notifications from said first notification service (16) includes the following successive steps:

the first notification service (16) addressing a registration message to the second notification service (18);

the second notification service (18) returning an identifier of the second notification service (18) to the first notification service (16); and the first notification service (16) storing said identifier of the second notification service for subsequent transmission of notifications to the second notification service (18).

4. A method according to claim 2, characterized in that the step of registering the first notification service (16) as an emitter of notifications to the second notification service (18) includes the following successive steps:

the first notification service (16) addressing an identifier of the first notification service (16) to the second notification service (18); and the second notification service (18) storing said identifier of the first notification service (16) to subsequently pick up notifications from the first notification service (16).

5. A method according to claim 1, characterized in that said first operation is performed by a notification service administrator (62) making a request to the second notification service (18).

6. A method according to claim 5, characterized in that the step of enrolling the second notification service (18) as a receiver of notifications from said first notification service (16) includes the following successive steps:

the second notification service (18) addressing an identifier of the second notification service (18) to the first notification service (16); and the first notification service (16) storing said identifier of the second notification service subsequently to notify notifications to the second notification service.

7. A method according to claim 5, characterized in that the step of registering the first notification service (16) as an emitter of notifications to the second notification service (18) includes the following successive steps:

the second notification service (18) addressing an enrollment message to the first notification service (16);

the first notification service (16) returning an identifier of the first notification service (16) to the second notification service (18); and the second notification service (18) returning said identifier of the first notification service (18) subsequently to pick up notifications from the first notification service (16).

8. A method according to claim 3, characterized in that each notification service (16, 18) comprises a set of software components (30, 32, 34, 40, 42) each including at least one notification channel (32, 34, 40) specific to a determined category of notifications, and in that the step of enrolling the second notification service (18) as a receiver of notifications from said first notification service (16) is performed, when said second notification service is notified, by said notification channel (32) of the first notification service (16) corresponding to the determined category of notifications implementing the identifier of the notification channel (42) associated with the second notification service (18).

9. A method according to claim 4, characterized in that each notification service (16, 18) comprises a set of software components (30, 32, 34, 40, 42) each including at least one notification channel (32, 34, 40) specific to a determined category of notifications, and in that the step of registering the first notification service (16) as an emitter of notifications to the second notification service (18) is performed, while picking up said notification from said first notification service, by the notification channel (42) of the second notification service (18) corresponding to the determined category of notifications implementing the identifier of the notification channel (32) associated with the first notification service (16).

10. A method according to claim 1, characterized in that the notification is transmitted from said emitter (10A) to said receiver (12A) on the initiative of said emitter (10A).

11. A method according to claim 1, characterized in that the notification is transmitted from said emitter (10A) to said receiver (12A) on the request of said receiver (12A).

12. A distributed-application information processing network comprising firstly a first notification zone (10) having a first notification service (16) associated therewith and having an emitter (10A) linked thereto, and secondly a second notification zone (12) having a second notification service (18) associated therewith and having a receiver (12A) linked thereto, each notification service performing at least one of (I) sending notifications of a determined category to receivers enrolled with the notification service and (ii) receiving notifications of a determined category from emitters registered with the notification service, the network being characterized in that it includes apparatus performing at least on of (I) enrolling the second notification service (18) as a receiver of notifications from said first notification service (16) and (ii) registering the first notification service (16) as an emitter of notifications to the second notification service (18), and transmitting apparatus transmitting said notifications from said emitter (10A) to said receiver (12A) via the first notification service (16) and the second notification service (18) in succession.

13. A network according to claim 12, characterized in that it includes a notification service administrator (50) adapted to address to the first notification service (16) a request for at least one of (i) enrollment of the second notification service (18) as a receiver of notifications from said first notification service (16) (ii) registration of the first notification service (16) as an emitter of notifications to the second notification service (18).

14. A network according to claim 13, characterized in that to enroll the second notification service (18) as a receiver of notifications from said first notification service (16), the first notification service (16) addresses a registration message to the second notification service (18), the second notification service (18) returns an identifier of the second notification service (18) to the first notification service (16), and the first notification service (16) stores said identifier of the second notification service in order subsequently to transmit notifications to the second notification service (18).

15. A network according to claim 13, characterized in that to register the first notification service (16) as an emitter of notifications to the second notification service (18), the first notification service (16) addresses an identifier of the first notification service (16) to the second notification service (18), and the second notification service (18) stores said identifier of the first notification service (16) in order subsequently to receive notifications from the first notification service (16).

16. A network according to claim 12, characterized in that it includes a notification service administrator (62) adapted to address to the second notification service (18) a request for at least one of (i) enrolling the second notification service (18) as a receiver of notifications from said first notification service (16) registering the first notification service (16) as an emitter of notifications to the second notification service (18).

17. A network according to claim 16, characterized in that to enroll the second notification service (18) as a receiver of notifications from said first notification service (16), the second notification service (18) addresses an identifier of the second notification service (18) to the first notification service (16), and the first notification service (16) stores said identifier of the second notification service in order subsequently to notify notifications to the second notification service.

18. A network according to claim 16, characterized in that to register the first notification service (16) as an emitter of notifications to the second notification service (18), the second notification service (18) addresses an enrollment message to the first notification service (16), the first notification service (16) returns an identifier of the first notification service (16) to the second notification service (18), and the second notification service (18) stores said identifier of the first notification service (16) in order subsequently to pick up notifications from the first notification service (16).

19. A network according to claim 14, characterized in that each notification service (16, 18) comprises a set of software components (30, 32, 34, 40, 42) each including at least one notification channel (32, 34, 40) specific to a determined category of notifications, and in that to enroll the second notification service (18) as a receiver of notifications from said first notification service (16), said notification channel (32) of the first notification service (16) corresponding to the determined category of notifications operates during sending of said notification to said second notification service to receive the identifier of the associated notification channel (42) of the second notification service (18).

20. A network according to claim 15, characterized in that each notification service (16, 18) comprises a set of software components (30, 32, 34, 40, 42) each including at least one notification channel (32, 34, 40) specific to a determined category of notifications, and in that to register the first notification service (16) as an emitter of notifications to the second notification service (18), the notification channel (42) of the second notification service (18) corresponding to the determined category of notifications operates while receiving said notification from said first notification service to store the identifier of the associated notification channel (32) of the first notification service (16).

21. A network according to claim 12, characterized in that at least one of the emitters and receivers is an object.

* * * * *